United States Patent [19]
Kaneko et al.

[11] 3,794,315
[45] Feb. 26, 1974

[54] BAG CONVEYOR SYSTEM WITH AUTOMATIC EDGE PRESSING

[75] Inventors: Keiji Kaneko; Hiroshi Ishida, both of Kanagawa, Japan

[73] Assignee: Fuji Photo Film Co., Ltd., Minami Ashigara-shi, Kanagawa, Japan

[22] Filed: July 19, 1971

[21] Appl. No.: 163,693

[30] Foreign Application Priority Data
July 17, 1970  Japan.............................. 45/62666

[52] U.S. Cl.................... 269/56, 53/372, 198/179, 269/232
[51] Int. Cl...... B23q 7/04, B65b 51/10, B65b 65/00
[58] Field of Search............................ 53/371–373; 269/55, 56; 83/277, 409, 409.1, 412; 198/179

[56] References Cited
UNITED STATES PATENTS
3,011,295  12/1961  Brugger ........................... 53/372 X
3,406,494  10/1968  Beck.................................. 53/372

*Primary Examiner*—Roy Lake
*Assistant Examiner*—Neil Abrams
*Attorney, Agent, or Firm*—Sughrue, Rothwell, Mion, Zinn & Macpeak

[57] ABSTRACT

A bag, such as an envelope, a sack, etc., is clamped on a moving conveyor at a place where both edges of the bag are cut off by fixed cam controlled pressing units associated with respective edges of said bags.

2 Claims, 4 Drawing Figures

INVENTORS
KEIJI KANEKO
HIROSHI ISHIDA

BY Sughrue, Rothwell, Mion, Zinn & Macpeak

ATTORNEYS

BAG CONVEYOR SYSTEM WITH AUTOMATIC EDGE PRESSING

BACKGROUND OF THE INVENTION

1. Field of the Invention

The present invention relates to a device for clamping a bag such as formed by plied sheets, an envelope, a sack, etc., by pressing both edges thereof at a place where it is cut in an automatic machine so as to be able to cut with accuracy and with swiftness.

2. Description of the Prior Art

In using ordinary automatic machines for cutting a bag which is conveyed, there is a recurring problem of roughness of the cutting edge thereof. The occurrence of the roughness is caused by looseness of the article against a cutter or a slitter.

For example, in an automatic wrapping machine that puts an article into a cylinder shape bag and conveys the bag on a conveyor, during the conveyance of which a mouth of the bag is opened and the bag lays so the mouth lies longitudinally, and cuts both edges thereof looseness of the bag on the conveyor against a slitter when it is cut causes trouble, in that cutting of both edges of the bag is not accurate which becomes a source of trouble in a succeeding process. In this case, both edges of the bag need to be pressed and set on the conveyor.

The prior art has attempted to obviate the above problems, but have generally found that the solutions suggested are rather complicated, expensive and hard to put into general practice.

SUMMARY OF THE INVENTION

The present invention is particularly designed to provide a new device to press both edges of a bag. Both edges of the bag are then cut with accuracy by a cutter in an automatic packing machine during conveyance on the conveyor.

BRIEF DESCRIPTION OF THE DRAWINGS

Other objects, features and advantages will be fully understood from the following description of a preferred embodiment when taken in conjunction with the accompanying drawings in which.

DESCRIPTION OF THE PREFERRED EMBODIMENT

The present invention provides a device for clamping (pressing and setting) both edges of a plurality of bags provided on a conveyor so that they are pressed and set at both edges thereof. It has been found that the provision of the both edge pressed bags has the effect of accurate cutting when they are treated in an automatic packing machine.

Figure 1:
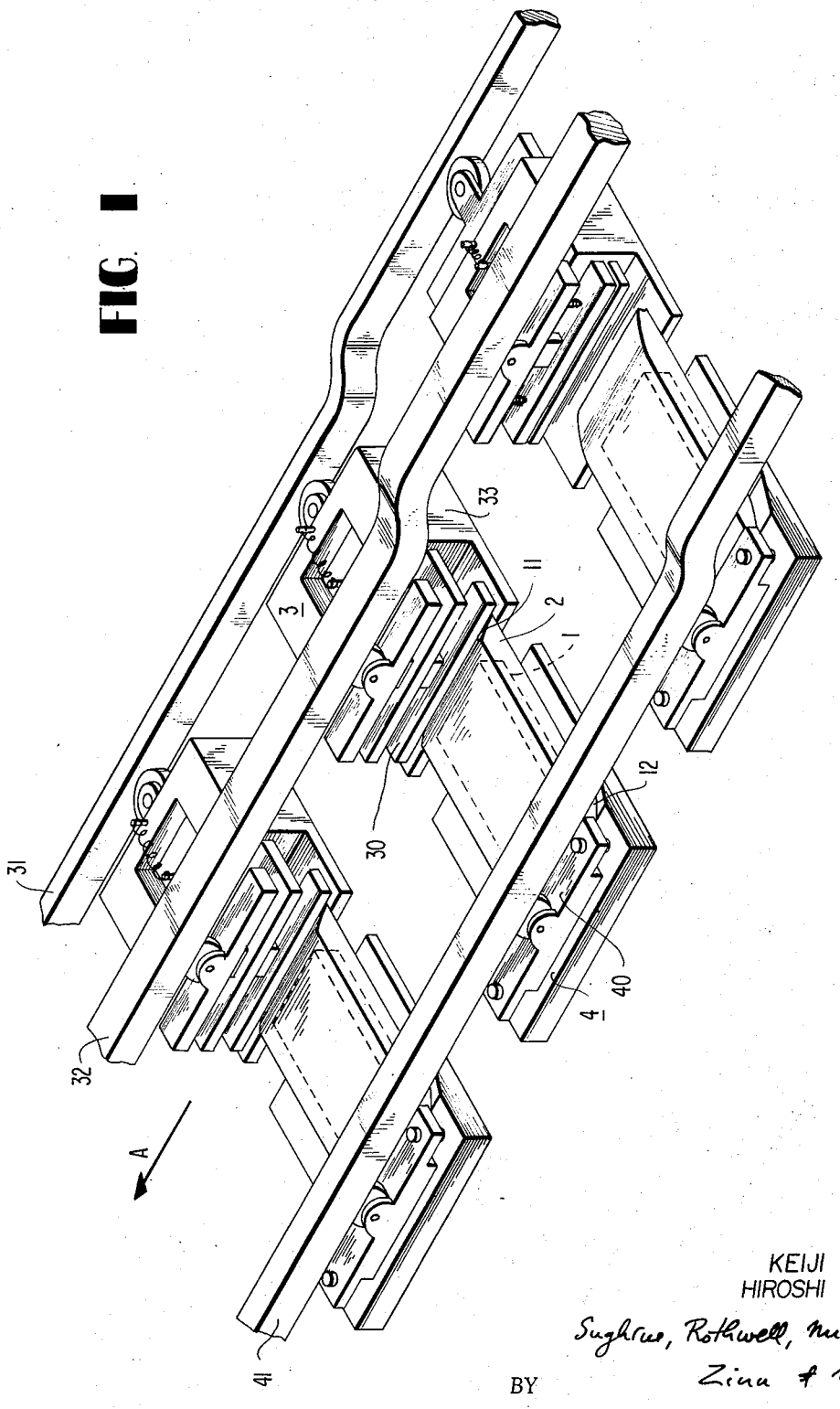
FIG. 1 is a perspective view of a device based on the present invention.

With reference to FIG. 1, a first pressing unit 3 and a second pressing unit 4 are mounted on a conveyor which sends a packed bag in the direction denoted by an arrow A. The packed bag contains an article 1 to be packed. The first pressing unit 3 presses an opening 11 of the bag and the second pressing unit 4 presses the shut side of the bag. The first pressing unit 3 comprises a pressing means 30 which is vertically and horizontally movable to a plane where the bag is conveyed, and it is mounted on a conveyor the speed of which is equal to that of the conveyor 5 which conveys the bag. The second pressing unit 4 is mounted on the conveyor 5 which conveys the bag.

Figure 4:
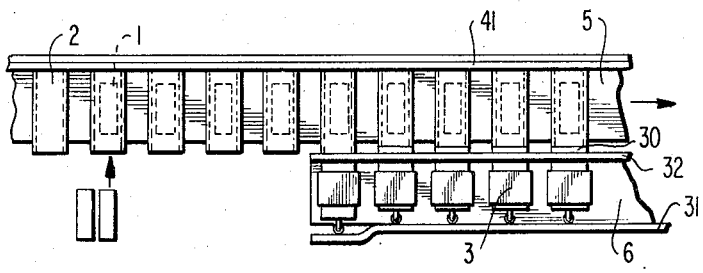
FIG. 4 is a simple plane view of a conveyor line using the device of the present invention.

FIG. 4 discloses an arrangement of the first pressing unit 3. The conveyor 5 is open at one side thereof facing the parallel pressing unit 3. The unit 3 comprises a conveyor 6, a vertical cam rail 32, a cam rail 31 and a pressing means 30. There is room for a worker or a device to put a bag on the conveyor 5. The pressing means 30 does not touch the bag until it starts to run parallel with the conveyor 5. The arrow in FIG. 4 shows the direction that the conveyor 5 runs. When the conveyor 5 and the conveyor 6 run parallel to each other, the pressing means come out horizontally from the conveyor 6 to permit it to press the opening 11 of the bag 2.

The embodiment of FIG. 1 discloses the second pressing means 4 which comprises a pressing means 40 and a cam rail 41. The pressing means 40 is always pushed upwards by a spring and is moved vertically against the force of the spring by the guide surface of the cam rail 41. The bag 2 is first put on the conveyor 5 and then is pressed by the pressing means 40 which is pushed down by the vertical cam rail 41.

Figure 2:
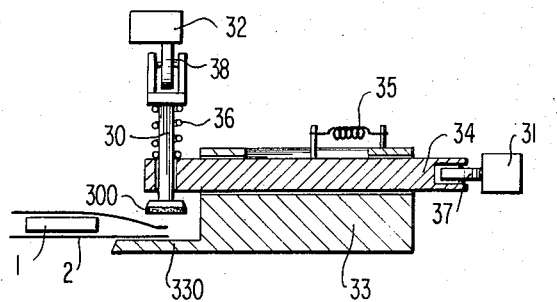
FIG. 2 is a sectional view of a main part of the device before it is operated.
Figure 3:
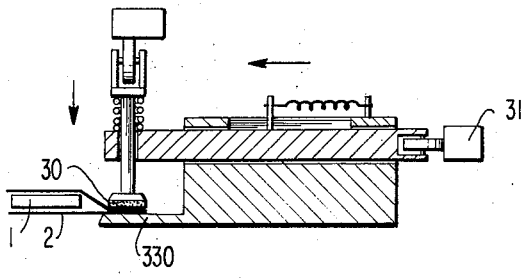
FIG. 3 is a sectional view of the main part of the device during operation thereof.

The embodiments of FIG. 2 and FIG. 3 disclose the structure of the pressing means 40 by denoting a section thereof. A support 33 is fixed on the conveyor 6. The sliding portion 34 is movably mounted on the support 33. A spring 35 draws the sliding portion 34 outwards. An inner side of the sliding portion 34 is equipped with vertically movable pressing means 30 which is always pushed upwards by a spring 36.

A roller 37 is mounted at a right end of the sliding portion 34. It is guided by a fixed vertical cam rail 31. A roller 38 is mounted at a top end of the pressing rod 30. It is guided by a cam rail 32.

The cam rail 31 is set to make the sliding portion 34 move horizontally to the right and left. The cam rail 32 is set to make the pressing portion 30 move vertically.

FIG. 1 also discloses the state of the cam rail 31 which makes the sliding portion 34 move to the left and the state of the cam rail 32 which makes the pressing portion 30 move downwards. The sliding portion 34 and the pressing portion 30 are made to move when the conveyor 6 begins to run parallel with the conveyor 5. The pressing portion moves downwards onto the rib 330 and presses the opening 11 of the bag 2 therebetween.

The cam rail 41 may cause pressure means 40 to press on edge 12 of the bag 2 before an article is put into the bag or may press the edge 12 after an article is put into the bag.

The bag is conveyed on the conveyor 5 and is pressed on both sides from the appointed portion by the arrangement of the pressing units and the cam rails as mentioned above.

The bag which is pressed on both sides by the device of the present invention is settled against the conveyor 5 and the conveyor 6. Therefore, the bag is cut with accuracy and ease by a slitter or other like machine (not shown). An accurate heat seal can be done when the bag is heat sealed by a sealer or other like machine (not shown).

If more accurate pressing is desired, a layer is set under the pressing portion 30. FIG. 2 discloses the layer at 300. This sort of layer may be set on the rib 330 from the supporter 33 when more accurate pressing is necessary.

The above disclosure is directed to the preferred embodiments of the present invention and it is obvious that minor modifications can be made in these embodiments within the scope and intent of the present invention as determined from the following claims.

What is claimed is:

1. In a conveyor system including a conveyor moving longitudinally and supporting at spaced postions, bags thereon, laterally spaced first and second pressing units movable with said conveyor and parallel thereto, each pressing unit including a series of vertically displaceable pressing means in proximity to opposed edges of said bags, for selectively clamping the respective edges thereof with said bags extending horizontally between respective pressing means, the improvement wherein:

each pressing means of one of said pressing units is mounted on said conveyor means for limited lateral movement towards the pressing means respectively of said other pressing unit but is spring biased therefrom, and said conveyor system further comprises:

a fixed horizontal cam rail extending parallel to said one pressing unit and having a horizontally offset portion operatively associated with said pressing means of said one unit to shift in sequence said pressing means towards said other unit to operatively position one edge of said bags carried by said moving conveyor into operative position with respect to said vertically displaceable pressing means of said one unit, and a pair of fixed vertical cam rails extending parallel to said conveyor means, overlying respective pressing units, in operative engagement with said pressing means of both units and having vertically offset portions to forcibly shift said pressing means of both units into pressing engagement with respective edges of said bags during conveyor movement.

2. The conveyor system as claimed in claim 1, wherein said vertical rail with said pressing unit not having laterally displaceable pressing means is offset upstream of the offset portions of said fixed horizontal cam rail and the fixed vertical cam rail associated with said other pressing unit.

* * * * *